INVENTOR
ALBERT B. EDWARDS

United States Patent Office 3,463,133
Patented Aug. 26, 1969

3,463,133
AUTOMATIC FUEL VAPORIZER
Albert B. Edwards, 4014 Ellendale Road,
Drexel Hill, Pa. 19026
Filed Apr. 30, 1968, Ser. No. 725,345
Int. Cl. F02m 23/04; F02d 31/00
U.S. Cl. 123—124                        5 Claims

ABSTRACT OF THE DISCLOSURE

This invention consists of an L-shaped bracket which is secured to a lateral structural member of a vehicle in front of and above the radiator of the vehicle. A bracket, having a vertically disposed leg with an opening in the lower portion thereof and an angularly disposed member, is secured to the underside of the first mentioned bracket. A movable blade is swingably mounted on the aforesaid vertically disposed leg by means of a spring-loaded pin or its equivalent. The blade has its lower end secured to an actuating vane that is pushed backward by the action of air as the vehicle moves forward. A coil spring has one end secured to the aforesaid movable blade and the other end secured to an angularly disposed member of the second mentioned bracket for a purpose hereinafter described. A tube has one end secured to the opposite side of the said vertically disposed leg from that of the aforesaid movable blade. The tube has its other end adapted to the intake manifold of the internal combustion engine just below the carburetor of the engine, thereby completing the installation of this invention on a vehicle.

---

This invention relates to fuel vaporizers; more particularly, to vaporizers of the automatic type; still more particularly, to automatic fuel vaporizers for use on vehicles having a radiator in the front thereof.

It is the principal object of this invention to provide an automatic fuel vaporizer of the character herein described that will automatically reduce the amount of fuel normally used and at the same time increase the efficiency of the internal combustion engine to which this device is attached.

Another object of this invention is to provide an automatic fuel vaporizer of the character herein described that can easily be mounted on nearly any vehicle powered by an internal combustion engine.

Another object of this invention is to provide an automatic fuel vaporizer of the character herein described that has a minimum number of easily manufactured and assembled parts.

Still another object of this invention is to provide an automatic fuel vaporizer of the character herein described that can be mounted on a vehicle in only a few minutes by an automobile or aircraft mechanic without the use of any special tools or the like.

Other and further objects and advantages of this invention will appear as the reading of this specification and its appended claims proceeds and the accompanying drawings are examined.

In the drawings.

In the several views of the drawings of this invention, like parts are indicated by like reference numbers.

The reference number 5 indicates the invention in its entirety.

Figure 1:
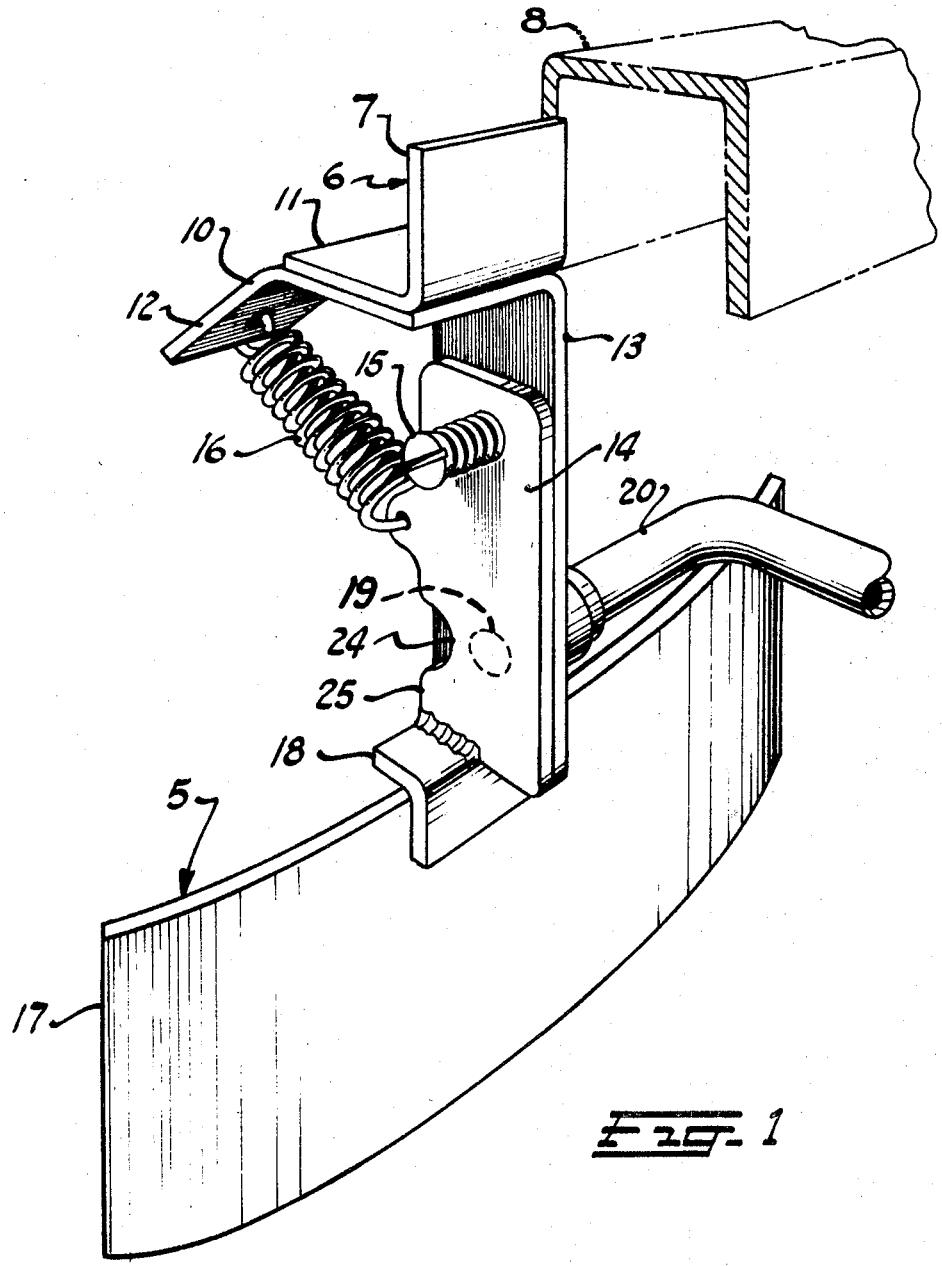
FIG. 1 is a pictorial view of this invention.

Looking first at FIGURE 1 it is seen that this invention consists of an L-shaped bracket 6 which has its vertical leg 7 suitably secured to inverted U-shaped laterally disposed member 8 or its equivalent that is located in front of the radiator 9 of the vehicle. A bracket 10 is suitably secured to the underside of the horizontally disposed leg 11 of the aforesaid bracket 6. Bracket 10 embodies both an angularly disposed member 12 and a vertically disposed leg or member 13 to which is swingably secured the movable blade 14 by means of the spring-loaded pin 15. A coil spring 16 has one end secured to the aforesaid angularly disposed member 12 and the other end secured to the movable blade 14 which the coil spring 16 holds in a vertical or closed position until a predetermined speed of the vehicle has been reached, as will hereinatfer be described. A curved member, which I personally call an actuating vane 17, is secured to the bottom of the aforesaid movable blade 14 by means of an inverted L-shaped member 18. With exception of the aforesaid spring-loaded pin 15 and the coil spring 16, all securement is done by means of welding. However, rivets and/or screws can be used, if it is so desired.

Continuing to look at FIGURE 1 of the accompanying drawings, it will be seen that an opening 19 is located in the lower portion of the aforesaid vertically disposed member 13. One end of a copper tube 20 or its equivalent is suitably secured over the opening 19 in member 13. The securement being on the back side of the often mentioned vertically disposed member 13. The other end of the aforesaid tube 20 is secured at 21 to the manifold 22 of the internal combustion engine 23. The point of securement 21 of the aforesaid tube 20 to the already mentioned manifold 22 being immediately below the carburetor, as one can see by looking at FIGURE 2 of the accompanying drawings.

The only part of this invention that has not so far been described is the U-shaped recess 24 in the edge 25 of the aforesaid movable blade 14. The recess 24 is slightly larger in size than that of approximately half of the circumference of the aforesaid opening 19 in the vertically disposed member 13.

Figure 2:
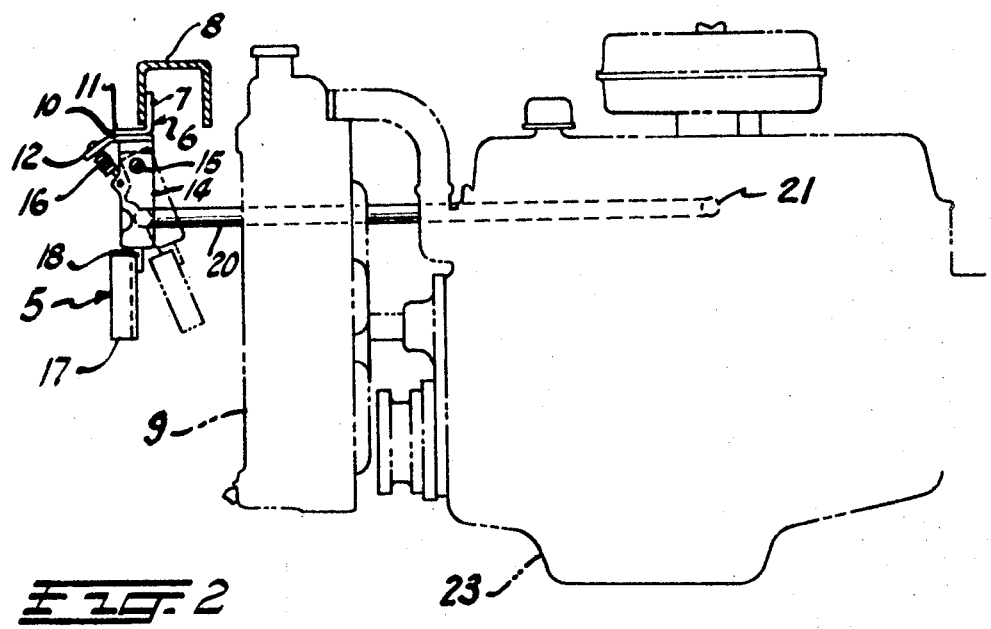
FIG. 2 is a side view of this invention, mounted on a vehicle.
Figure 3:
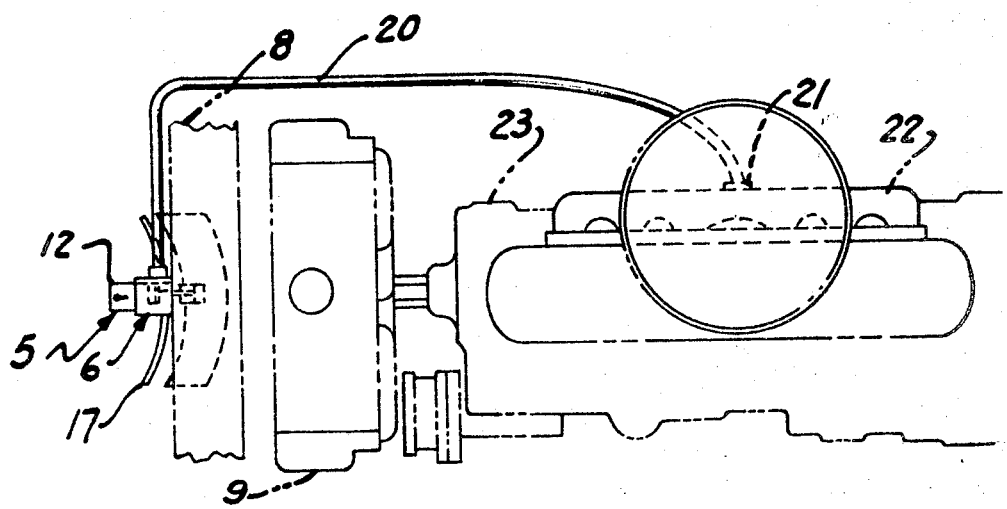
FIG. 3 is a top view of FIGURE 2.

The way in which this novel invention of an automatic fuel vaporizer works is understandable from examination of FIGURE 2 of the accompanying drawings. Here it is seen that when this invention is properly mounted on the vehicle, and the aforesaid copper tube is connected, as previously described, then this invention will supply air to the aforesaid manifold 22 when the vehicle has reached a predetermined speed and the air has pushed the aforesaid actuating vane backward against the pull of the coil spring 16, as has been previously stated. The action of the spring on the vane holds the movable blade 14 in a closed position until a predetermined speed of the vehicle has been reached. When this happens, the air under pressure enters the aforesaid opening 19 and on into the tube 20 to the manifold of the internal combustion engine 23, thereby increasing the efficiency of the engine, as will be understood by one experienced in theory and operation of internal combustion engines.

The construction of this invention is such that the aforesaid actuating vane 17 will move to the open position when the vehicle has reached an approximate speed of 17 miles per hour and will close on slowing down to 12 miles per hour.

This invention is subject to any and all changes and/or modifications one may care to make in the same in so long as the changes and/or modifications fall within the scope and intent of the appended claims.

What I now claim as new is:

1. An automatic fuel vaporizer of the character described, comprising a pair of L-shaped brackets secured to one another by any desired means; one of the brackets having an opening in the vertical leg thereof through which air will be forced into a tube having one end secured to the said leg and encompassing the opening in the said leg, the other end of the said tube being secured to the intake manifold of an internal combustion engine of a vehicle on which the said vaporizer is mounted, the mounting being just in front of the radiator of the said vehicle; and means of automatically opening and closing the entrance of the said tube when the said vehicle has reached a predetermined forward speed.

2. The invention of claim 1, wherein a movable blade is the means of automatically opening and closing the entrance of the said tube.

3. The invention of claim 2, wherein the said movable blade has its upper end hingedly secured to the said vertically disposed leg by means of a spring-loaded pin.

4. The invention of claim 3, wherein the lower end of the said movable blade is provided with an actuating vane that is acted upon by pressure of air entering the radiator grill of the said vehicle.

5. The invention of claim 4, wherein the said movable blade is provided with a coil spring that normally holds the said blade in a vertical and closed position over the opening in the said vertically disposed leg of one of the brackets that go to make up this invention.

References Cited

UNITED STATES PATENTS

| | | | |
|---|---|---|---|
| 1,117,676 | 11/1914 | Johnson | 123—124 |
| 1,212,745 | 1/1917 | Crockett | 123—124 |
| 1,219,202 | 3/1917 | Waldmeier | 123—124 |
| 1,224,774 | 5/1917 | Miner | 123—124 XR |
| 1,276,762 | 8/1918 | Hodges | 123—124 |
| 1,323,766 | 12/1919 | Hodges | 123—124 |
| 1,391,144 | 9/1921 | Russell | 123—124 |
| 1,463,532 | 7/1923 | Krichbaum | 123—124 |
| 1,505,288 | 8/1924 | Rivers et al. | 123—124 |

WENDELL E. BURNS, Primary Examiner

U.S. Cl. X.R.

123—97, 103, 119